No. 752,420. PATENTED FEB. 16, 1904.
D. ROWE.
SAW HOLDER.
APPLICATION FILED JULY 9, 1903.
NO MODEL.
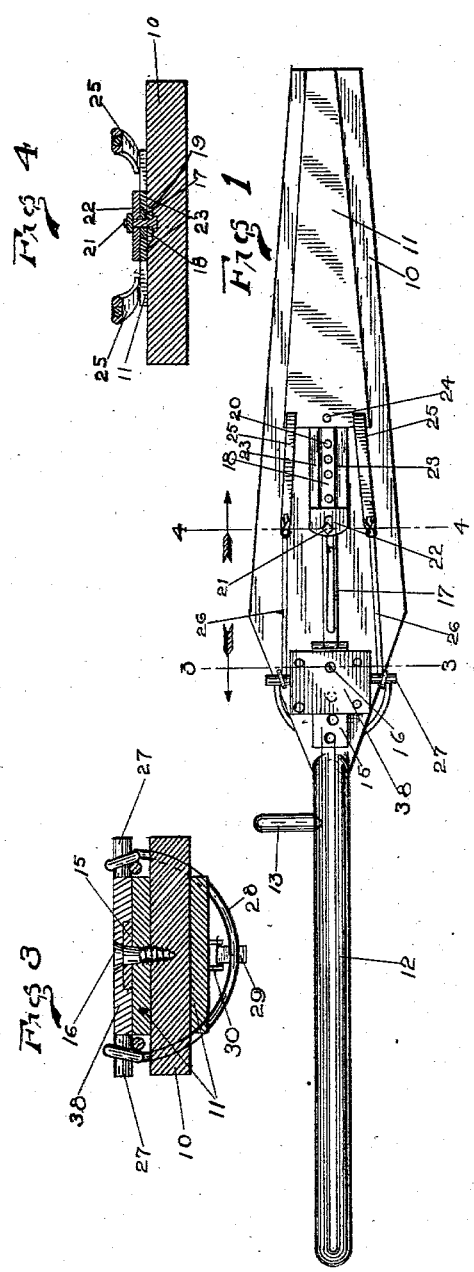

No. 752,420. Patented February 16, 1904.

UNITED STATES PATENT OFFICE.

DAVIS ROWE, OF INDIANAPOLIS, INDIANA.

SAW-HOLDER.

SPECIFICATION forming part of Letters Patent No. 752,420, dated February 16, 1904.

Application filed July 9, 1903. Serial No. 164,834. (No model.)

*To all whom it may concern:*

Be it known that I, DAVIS ROWE, of Indianapolis, county of Marion, and State of Indiana, have invented a certain new and useful Saw-Holder; and I do hereby declare that the following is a full, clear, and exact description thereof, reference being had to the accompanying drawings, in which like numerals refer to like parts.

The object of this invention is to provide an efficient and simple means for holding a saw, such as a hand-saw, while the same is being ground in the manufacture thereof.

Heretofore different-sized holders have been required for different-sized saws, and the chief advantage of this invention is to provide a single holder for saws of varying sizes.

The full nature of the invention will be understood from the accompanying drawings and the following description and claims.

In the drawings, Figure 1 is a plan view of the device with a saw thereon. Fig. 2 is a central vertical longitudinal section thereof. Fig. 3 is a transverse section on the line 3 3 of Fig. 1, but on a larger scale. Fig. 4 is the same on the line 4 4 of Fig. 1. Fig. 5 is the same as the middle portion of Fig. 2 on a larger scale.

In detail there is shown herein a board 10, that is preferably tapering, which is adapted to receive upon it a saw 11 at one end. At the other end there is secured a shank 12, which is held by the right hand, and a handle 13 extends laterally from the shank 12 and is held by the left hand for the purpose of holding the saw 11 under the grindstone. Preferably the inner end of the shank 12 is slotted to receive the end of the board 10, as shown in Fig. 2. Upon the shank and at the union of it with the board 10 a metal plate 15 is secured by the screws 16. To the forward end of said plate 15 there is hinged a bar 17, that is longitudinally slotted. A bar 18 rests beneath the bar 17 in a longitudinal recess or groove 19 in the top of the board 10. Said bar 18 has a series of holes 20 through it, through which a bolt 21 passes, and said bolt also extends through a plate 22 above said bar 17, and it carries a pair of abutting bars 23, there being one of the abutting bars 23 on each side of the bar 18. With this arrangement the abutting bars and also the bar 18 may be adjusted in position and clamped at any desired place. On the outer end of the bar 18 there is an upwardly-extending pin 24, adapted to engage the saw 11 by extending through a hole in said saw. Since the bar 18 has a number of holes 20, it may be longitudinally adjusted with relation to the plate 22 and abutting bars 23.

The two adjustments of the abutting bars 23 and the holding-bar 18, above referred to, is to adapt this saw-holder to saws of varying lengths. If a saw should be placed on the holder that is longer than the one shown, the abutting bars 23, as well as the holding-bar 18, would be moved and adjusted to the left and then clamped tightly on the bar 17. There is also a pair of clamping-bars 25, the ends of which bear down upon the saw, there being one upon each side of the saw-holding means above described. These bars 25 are secured by set-screws 36 to wire rods 26, coiled about transverse pins 27, extending from a plate 38, that is secured to the shank 12 at its conjunction with the holding-board 10, as appears in Figs. 1 and 3. The two wire rods 26 are continued beneath the shank and unite to form a single rod 28, that passes through the end of a bell-crank-shaped handle 29, pivoted by the bracket 30 to the under side of the shank 12 near its extreme end, as shown in Fig. 2. The extreme end of the rod 28 is threaded to receive a nut 31, whereby the relative position of the rod 28 and the handle 29 may be adjusted to bring about the desired movement of the rods 26 to cause them to hold the bars 25 down tightly on the saw.

When the saw is mounted on the holder for grinding, the parts are in the position shown in Figs. 1 and 2, and the extreme end of the shank 12, as well as the handle 29, are held by the right hand. When the saw has been ground, the handle 29 is released, which causes the release by bars 25 of the saw, and it is then lifted off the pin 24 and removed. Another saw is inserted by the saw being placed with the pin 24 extending through the hole and then the clamping-bars 25 being drawn down tightly on the saw by grasping the extreme end of the shank 12 and the handle 29 and bringing the latter to the position shown in Fig. 2, then with the left hand holding the handle 13 the saw can be easily held in position under the grindstone.

The slot 19 is for the purpose of embedding the bar 18 so that its upper surface will be flush with the upper surface of the board and enable the saw to rest flatly on the board. Said slot also serves as a guideway for the adjusting movement of the bar 18 and to prevent its lateral movement, and thereby render the holding means more firm. The abutting bars 23 being adjusted with relation to the pin 24 on the bar 18 enables the device to hold different-sized saws, although the position of the hole in the saws through which the pin 24 extends may vary in the different saws.

What I claim as my invention, and desire to secure by Letters Patent, is—

1. A saw-holder for holding flat saws in place against a grindstone including a board upon which the saw may lie, a pin extending upward from said board adapted to pass through a hole in the saw for holding it from longitudinal movement, a bar on each side of said pin that abuts against the end of the saw for preventing oscillatory movement of the saw, and a clamping-bar to press upon the saw on each side of said pin for holding it down on said board.

2. A saw-holder for holding flat saws in place against a grindstone including a board upon which the saw may lie with a recess or groove in its upper surface, a bar fitting in said recess or groove flush with the upper surface of the board and having a pin extending therefrom adapted to pass through a hole in the saw for holding it from longitudinal movement, a bar on each side of said pin that abuts against the end of the saw for preventing oscillatory movement of the saw, and a clamping-bar to press upon the saw on each side of said pin for holding it down on said board.

3. A saw-holder for holding flat saws in place against a grindstone including a board upon which the saw may lie with a recess or groove in its upper surface, a bar longitudinally adjustable in said recess or groove and flush with the upper surface of the board and having a pin extending therefrom adapted to pass through a hole in the saw, means for mounting said bar so as to be longitudinally adjustable, a bar on each side of said pin that abuts against the end of the saw for preventing oscillatory movement of the saw, and a clamping-bar to press upon the saw on each side of said pin for holding it on said board.

4. A saw-holder for holding flat saws in place against a grindstone including a board upon which the saw may lie, a pin extending upward from said board adapted to pass through a hole in the saw for holding it from longitudinal movement, a bar on each side of said pin that abuts against the end of the saw for preventing oscillatory movement of the saw, a clamping-bar to press down upon the saw on each side of said pin for holding it down on the board, and means for mounting said bars that bear down upon the saw so as to be longitudinally adjustable.

5. A saw-holder for holding flat saws in place against a grindstone including a board upon which the saw may lie, a pin extending upward from said board adapted to pass through a hole in the saw for holding it from longitudinal movement, a bar on each side of said pin that abuts against the end of the saw for preventing oscillatory movement of the saw, a clamping-bar to press down upon the saw on each side of said pin for holding it down on the board, a shank connected with said board whereby the same may be held, and means mounted on said shank and extending to said clamping-bars for operating them.

6. A saw-holder for holding flat saws in place against a grindstone including a board upon which the saw may lie, a pin extending upward from said board adapted to pass through a hole in the saw for holding it from longitudinal movement, a bar on each side of said pin that abuts against the end of the saw for preventing oscillatory movement of the saw, a clamping-bar to press down upon the saw on each side of said pin for holding it down on the board, a shank secured to said board whereby the same may be held, a plate near the union of said board and shank having opposite transversely-extending pins, a rod pivoted on each pin and at one end connected with said clamping-bars and at the other end extending along said shank, a hand-lever pivoted on said shank convenient for operation by the hand that is connected with said rods so that the operation of the hand-lever will oscillate said rod to press said clamping-bars down upon the saw or release the same.

In witness whereof I have hereunto affixed my signature in the presence of the witnesses herein named.

DAVIS $\overset{\text{his}}{\times}$ ROWE.
mark

Witnesses:
V. H. LOCKWOOD,
NELLIE ALLEMONG.